(12) United States Patent
Davis et al.

(10) Patent No.: US 8,108,481 B2
(45) Date of Patent: Jan. 31, 2012

(54) COMMUNITY CACHING NETWORKS

(75) Inventors: Marc Davis, San Francisco, CA (US);
Jeonghee Yi, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 230 days.

(21) Appl. No.: 12/240,524

(22) Filed: Sep. 29, 2008

(65) Prior Publication Data
US 2010/0082764 A1 Apr. 1, 2010

(51) Int. Cl.
*G06F 15/173* (2006.01)
*G06F 15/16* (2006.01)

(52) U.S. Cl. .......... 709/213; 709/217; 709/212

(58) Field of Classification Search .......... 709/212, 709/213, 217
See application file for complete search history.

(56) References Cited

U.S. PATENT DOCUMENTS

| | | | |
|---|---|---|---|
| 5,944,780 A * | 8/1999 | Chase et al. | 709/201 |
| 7,136,969 B1 * | 11/2006 | Niver et al. | 711/141 |
| 7,783,777 B1 * | 8/2010 | Pabla et al. | 709/238 |
| 2002/0091792 A1 * | 7/2002 | Janniello et al. | 709/217 |
| 2007/0162524 A1 | 7/2007 | Coe et al. | |
| 2007/0233957 A1 * | 10/2007 | Lev-Ran et al. | 711/118 |
| 2007/0250513 A1 | 10/2007 | Hall et al. | |
| 2008/0089299 A1 * | 4/2008 | Lindsley et al. | 370/338 |
| 2008/0140520 A1 | 6/2008 | Hyder et al. | |
| 2008/0154879 A1 | 6/2008 | Lin | |
| 2010/0121975 A1 * | 5/2010 | Sinha et al. | 709/231 |

* cited by examiner

*Primary Examiner* — Kenny Lin
(74) *Attorney, Agent, or Firm* — Brinks Hofer Gilson & Lione (57) ABSTRACT

A system for sharing data within a network, the system including a first peer device coupled with the network that comprises local cache storage configured to store data comprising at least one entry designated as network accessible cache data and a cache control module operative to control access to the data stored in the local cache storage. The system further includes a second peer device coupled with the first peer device via the network where the second peer device is configured to request network accessible cache data stored in the local cache storage of the first peer device. Furthermore, the cache control module of the first peer device is configured to transmit at least a portion of the requested network accessible cache data to the second peer device in response to the request for network accessible data stored from the second peer device.

33 Claims, 5 Drawing Sheets

COMMUNITY CACHING NETWORKS

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Users of network-connected computers and mobile devices (networked devices), such as personal digital assistants, may request information by formulating a search query and submitting the search query, for example, to an Internet search engine. Internet search engines are often used to search (i.e. query) the Internet for specific content that is of interest to the user. Additionally, networked devices may communicate with one another to perform various functions such as data transfers and/or data sharing via a distribution network.

With the growth of the Internet and the World Wide Web, networked devices are being increasingly relied upon for greater and more frequent access to information on the World Wide Web as well as for as for providing connectivity with various participants within a distribution network. However, despite the increased demand for networked information, the distribution networks used to transmit the requested information from a data source to the users often have a limited capacity (i.e., limited bandwidth).

For example, networks utilized in poorly developed geographic regions within developing countries are often characterized by extremely limited connectivity or bandwidth that is too costly to fully exploit. In some instances, these regions may have limited to no connectivity options at all given their remote geography.

DETAILED DESCRIPTION

The following description is merely exemplary in nature and is in no way intended to limit the disclosure, its application, or uses. For purposes of clarity, the same reference numbers will be used in the drawings to identify similar elements. To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. Herein, the phrase "coupled with" is defined to mean directly connected to or indirectly connected through one or more intermediate components. Such intermediate components may include both hardware and software based components.

The Internet is increasingly relied upon as a primary source of data (e.g., textual content, graphical content, audio content, etc.) for networked device users. However, the cost associated with requesting and receiving (i.e., downloading) content via the Internet may, at times, be prohibitive to some users. Additionally, some users may have limited connectivity to the Internet due in part to their isolated geographical location and/or lack of access to a well-developed network infrastructure. As a result, these users (e.g., users in developing countries) are left with few alternatives when attempting to obtain various types of information.

Web caching is one technique that has been employed to minimize the expense associated with frequent access to the Internet, particularly with regards to mobile networked devices. Web caching is the process of storing copies of previously requested and/or computed Internet data (e.g., previous requested web content) in a local, fast-access memory of a networked device commonly known as a cache in an effort to reduce bandwidth utilization and the workload of back-end servers that provide the Internet content. Typically, the web cache of a networked device contains a collection of the most recently accessed Internet content and can serve as the source of data for similar web content requests made in the future by the networked device.

However, the web content is locally stored in the web cache of a given networked device and therefore is only accessible to the given networked device. In other words, each networked device coupled to a given network must independently connect to the Internet and download the identical web content (i.e., each respective networked device must incur the costs associated with Internet connectivity to gain access to the same web content).

By way of introduction, the embodiments described herein are related to various systems and methods that provide for the access and distribution of data within a community of networked devices and are merely exemplary in nature. More particularly, the present disclosure describes a caching system that provides a cost effective alternative for distributing information within a community of networked devices. In some embodiments, the disclosed system may be further utilized to provide various users with access to Internet resources without requiring each of the users to access the Internet.

As used herein, a search engine refers to a computer program that is configured to search the contents of sources, such as a database, to locate information related to a search query. A search query refers to a term, phrase, or group of terms, possibly combined with other syntax, symbols, and numbers, etc. that characterizes information that a user seeks to obtain from the search engine.

Figure 1:
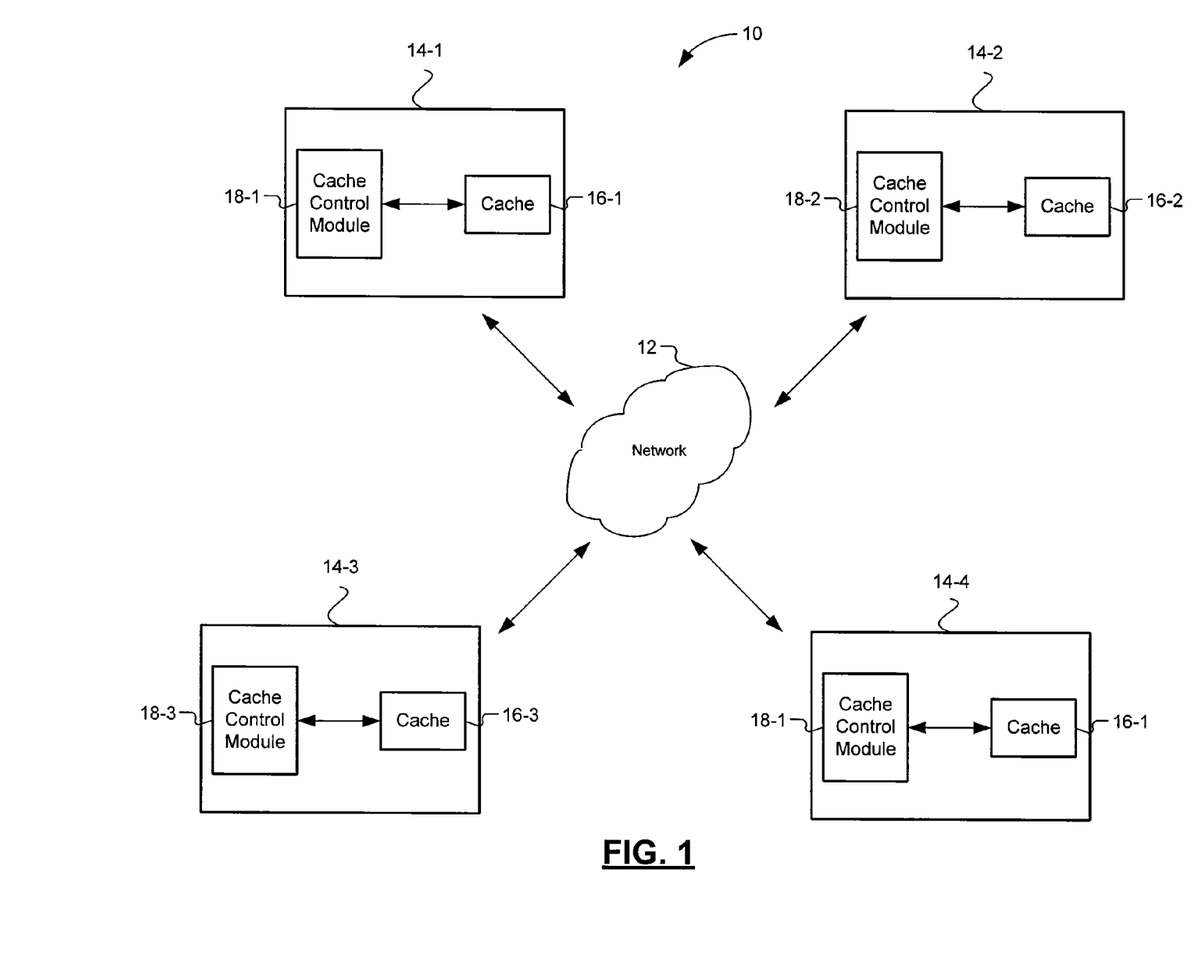
FIG. 1 is a functional block diagram illustrating an exemplary system including a caching.

FIG. 1 depicts an exemplary system 10 that implements one embodiment of the disclosed caching system. The system 10 includes a network 12 and peer devices 14-1, 14-2, 14-3, and 14-4, referred to collectively as the peer devices 14. Each of the peer devices 14 are coupled with the network 12, thereby enabling each of the peer devices 14 to communicate and pass data to and from one another. In alternate embodiments, there may be additional peer devices 14, and additionally intermediate networks (not shown) that are established to connect the peer devices 14.

In the present embodiment, the network 12, or "community", may include one or more of a wireless network, a wired network, a personal area network (PAN), a local area network (LAN), a wide area network (WAN), a direct connection such as through a Universal Serial Bus (USB) port, and may include the set of interconnected networks that make up an intranet, or other communication network. The network 12 may be the network discussed below with respect to FIG. 5.

The peer devices 14 may be any device that a user (e.g., an individual, a business entity or group of people) utilizes to connect with the network 12. The peer devices 14 may include at least one application that is configured to receive content from another peer device 14. The application may include a capability to provide and receive textual content, graphical content, audio content, etc. such as, for example, hypertext markup language (HTML), electronic images, portable document files (PDFs), flash files, emails, and/or messages by providing a data connection. The data connection may be a cellular connection, a wireless data connection, an infra-red connection, a Bluetooth connection, or any other connection capable of transmitting data.

For example, the peer devices 14 may include conventional personal computers, computing devices, or mobile user devices, including network-enabled mobile phones, VoIP phones, cellular phones, personal digital assistants (PDAs), pagers, network-enabled televisions, digital video recorders, an/or an automobiles. Peer devices 14 are configured to connect with the network 12, may be the general computer system or any of the components as described with respect to FIG. 5. Each of the peer devices 14 may function to provide and/or receive information to and/or from each of the other peer devices 14 coupled to the network 12. Furthermore, a user of the peer devices 14 may not only include an individual, but a business entity or group of people.

In the present embodiment, user devices 14-1, 14-2, 14-3, and 14-4 respectively include local caches 16-1, 16-2, 16-3, and 16-4, collectively referred to as the local caches 16, and cache control modules 18-1, 18-2, 18-3, and 18-4, referred to collectively as the cache control modules 18. Local caches 16-1, 16-2, 16-3, and 16-4 are coupled with cache control modules 18-1, 18-2, 18-3, and 18-4, respectively. It will be appreciated that one or more of the modules may be integrated together or further sub-divided into additional discrete components. It will also be appreciated that the embodiments disclosed herein may be implemented in one or more computer programs executing on one or more programmable systems comprising at least one module and at least on data storage system. Each such program may be implemented in any desired computer language to communicate with a computer system. Furthermore, variations in the arrangement and type of modules may be made without departing from the spirit or scope of the claims as set for herein. Additionally, different and/or fewer modules may be provided.

Each local cache 16 represents a temporary storage unit, or temporary memory, within its respective peer device 14 that contains cached data (i.e., data that has been stored within a given cache 16) that may either be frequently accessed by a user of the respective peer device 14 and/or "published" (i.e., data made available for access and retrieval by other peer devices 14 coupled to the network 12) by the peer device 14. "Published" cache data, also referred to as network accessible cache data, will be discussed in more detail below. Cached data stored within each of the caches 16 may include, for example, textual content, graphical content, audio content, etc. such as, for example, hypertext markup language (HTML), electronic images, portable document files (PDFs), flash files, emails, and/or messages. Each local cache 16 may be implemented as volatile memory, non-volatile memory, rewritable memory etc. For example, each local cache 16 may include, but is not limited to, random access memory (RAM), read only memory (ROM), and/or flash memory.

The network 12 may operate with various degrees of decentralization. For example, the network 12 may operate as a completely decentralized community. In other words, the peer devices 14 collectively constitute the system 10 without any consolidated, or central, coordination of the cached data (i.e., the published cache data) stored in each respective cache 16. In other embodiments, the network 12 may be configured as a distributed content system in which portions of desired published cache data are distributed among various caches 16 of the peer devices 14. Therefore requests for desired published cache data generated by a peer device 14 are required to be carried across the network 12 to each of the various contributing peer devices 14.

As mentioned above, cached data may be published (i.e., made accessible) for use by other peer devices 14 (i.e., for use by other users of the network) coupled to the network 12. In some embodiments, an entire cache 16 may be published. In other embodiments, selected cache entries (i.e., a subset of the cached data) may be published. Each peer device 14 may be configured to enable a respective user to provide input to the associated peer device 14 that selectively designates, or classifies, a subset of the cached data (i.e., at least one entry of the cache data) as published, or network accessible, cache data. Additionally, each peer device 14 enables a user to make requests for published cache data stored in a cache 16 of another peer device 14. In other words, each peer device 14 may function as a "client" in that each peer device 14 is configured to request published cache data from another peer device 14 coupled with the network 12. Each peer device 14 may further function as a "server" in that each peer device 14 is configured to provide published cache data to another peer device 14. In some instances, a peer device 14 may alternate between operating as a client and a server.

As such, in the present embodiment, each peer device 14 coupled with the network 12 may leverage the published cache data stored within each other's respective caches 16 without requiring any of peer devices 14 to establish an Internet connection. In other words, the users of the peer devices 14 coupled to the network 12 may share content despite externally imposed constraints on their connectivity to the Internet such as their geographic location as well as the associated financial burden.

As mentioned above, the cache control modules 18 may perform both server-side and client-side functions. For example, each cache control module 18 processes requests for content received from other peer devices 14 and determines whether the desired content is within its published cache data. The cache control modules 18 control the transmission of any published cache data determined to satisfy a request generated by another peer device 14. Each cache control module 18 further processes commands from its associated user to publish, or post, selected cache data.

The cache control modules 18 may employ several techniques for searching for content stored in other peer devices 14. In some embodiments, the cache control modules 18 of each of the peer devices 14 may exchange indexes cataloging the published cache data stored within their respective caches 16. Each cache control module 18 may then search and retrieve desired published cache data by referencing the respective indexes of each of the other cache control modules 18 coupled to the network 12. In such embodiments, as an additional peer device 14 joins (i.e., connects to) the network 12, the cache control module 18 of the additional peer device 14 transmits its respective index to the other peer devices 14 coupled with the network 12. Additionally, each cache module 18 may broadcast a message to the other peer devices 14 coupled to the network 12 in search of desired published cache data.

The cache control modules 18 may further be configured to operate as a "proxy server". For example, a first cache control module 18 may contact and request desired published cache data from another peer device 14 (i.e., a second cache control module 18) on behalf of a third peer device 14. In this context, the third peer device 14 operates as a "client", requesting published cache data stored in a cache 16 associated with the second cache control module 18 (i.e., "the server") via the first cache control module 18. In other words, the first cache control module 18 (i.e., the first peer device) serves to relay the request and published cache data between the second and third peer devices. In this configuration, each cache control module 18 serving as intermediary, such as the first cache control module 18 discussed above, between a "server" and a "client" may also store the published cache data upon receiving the published cache data via the data transfer between the server and the client.

Publishing cache data may include a data publishing operation in which cache data within a given cache 16 is stored or otherwise made accessible so that another peer device 14 may retrieve the published cache data. The data publishing operation may include modifying the access restrictions to the cache data stored within a given cache 16 thereby permitting other peer devices 14 to have access to the cache data.

In some embodiments, the data publishing operation may include enabling accessibility to published cache data within a given cache 16 to a limited group of peer devices 14. Specifically, each cache control module 18 may control various layers of privileges and/or permissions associated with select portions of the published cache data stored within a respective cache 16. In one embodiment, the caching system of the present disclosure may utilize a "social networking" scheme in that accessibility to the published cache data of a given peer device 14 may be granted to specific peer devices 14 that possess a particular "network relationship" with the given peer device 14 (i.e., access may be granted to users of other peer devices 14 that possess a particular relationship with the user of the given peer device 14). For example, the network may comprise a user's set of direct and/or indirect personal relationships and/or a user's set of direct and/or indirect business relationships. In some embodiments, users of the peer devices 14 may define various permission layers allowing distinct degrees of access to the published cache data stored within their respective caches 16.

Figure 2:
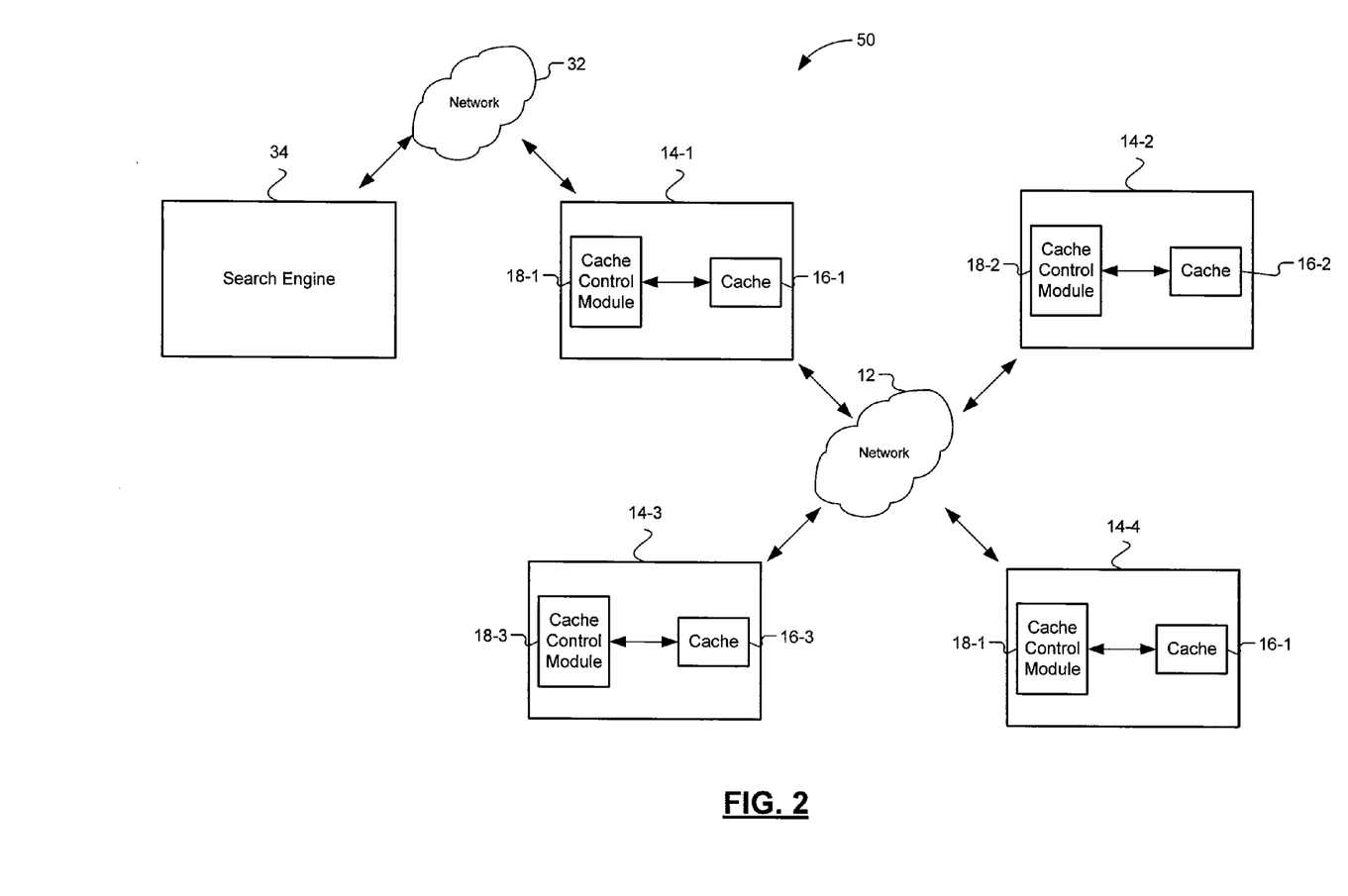
FIG. 2 is a functional block diagram of an exemplary implementation of the caching system.

FIG. 2 depicts an exemplary implementation of the disclosed caching system. In FIG. 2, a system 50 further includes a network 32 and a search engine 34. In the present implementation, peer device 14-1 is depicted as being coupled with search engine 34 via the network 32. Those skilled in the art will appreciate that each of the peer devices 14 may individually establish a connection with the search engine via the network 32.

The network 32 enables the peer device 14-1 to communicate with the search engine 34. The network 32 may include any communication method by which information may travel between the various components of the system 30. The network 232 may include one or more of a wireless network, a wired network, a local area network (LAN), a wide area network (WAN), a direct connection such as through a Universal Serial Bus (USB) port, and may include the set of interconnected networks that make up the Internet, intranet, or other communication network. The network 22 may be the network discussed below with respect to FIG. 5.

A user of the peer device 14-1 utilizes the search engine 34 via the network 32. The peer devices 14 may be any device that a user utilizes to connect with either the networks 12 or 32. In the present implementation, the network 32 is the Internet and the peer device 14-1 connects with a website provided by a web server, such as the search engine 34, that is in communication with the network 32. In alternate implementations, multiple peer devices 14 representing the users may connect with the network 32. For example, one or more of the peer devices 14-2, 14-3, and 14-4 may concurrently or separately connect with the network 32 (i.e., the Internet) for a period of time.

As discussed above, a user of the peer devices 14 may not only include an individual, but a business entity or group of people. Any users may utilize the peer devices 14, which may include a conventional personal computer, computing device, or a mobile user device, including a network-enabled mobile phone, VoIP phone, cellular phone, personal digital assistant (PDA), pager, network-enabled television, digital video recorder, an/or an automobile. The peer devices 14 are configured to connect with the network 32, may be the general computer system or any of the components as described with respect to FIG. 5. In the present implementation, the peer devices 14 are configured to communicate with the search engine 34 through the network 32 with a web browser, such as Internet Explorer. The web browser provides an interface through which users may receive search results in response to a search query submitted via the peer devices 14. In alternate implementations, there may be additional peer devices, and additionally intermediately networks (not shown) that are established to connect the users or peer devices 14.

The search engine 34 may be a content provider or a web server operated over the network 32 that provides pages to users, via a peer device 14. Peer devices 14 may be represented by user-interactive devices that typically run browser applications, and the like, to display requested web pages (i.e., requested URLs) received over the network 32 as described above. The search engine 34 may comprise a general computing system or any of the components as described with respect to FIG. 5. In various embodiments, the search engine 34 is a webserver that provides a website that may be accessed by users and includes the ability to conduct a search over the network 34, such as the Internet. The search system offered by Yahoo! Inc. is one example of a search engine embedded in a website (www.yahoo.com). The search engine 34 may receive a search query from a user and provide search results to the user. The search engine 34 may also provide other content and/or advertisements in addition to the search results.

In one embodiment, the search engine 12 may comprise a registration database (not shown) utilized to store registration data provided by various users 18 enabling the user 18 to activate and log into a user account via the user device 20. The registration data may include information such as each respective user's login name, password, and/or address. The registration database may also include personal information about each respective user 18.

As mentioned above, in the present implementation, a user of one of the peer devices 14 may receive search results, advertisements, or other types of content by communicating with the search engine 34 via the network 32. Typically, access to the Internet (e.g., the network 32) requires a user to pay an Internet usage or access fee in order to utilize the network 32. For example, as currently depicted, a user of peer device 14-1 would generally be required to pay to an Internet Service Provider a charge in order to connect to the network 32.

Upon receiving content from the search engine 34 via the network 32, the peer device 14-1 may locally store the content within the cache 16-1 of the peer device 14-1. A user of the peer device 14-1 may then subsequently designate the content as published cache data, thereby enabling the other peer devices 14 coupled to the local network 12 to have access to the content as discussed in FIG. 1. In other words, users of the system 50 may collectively benefit from content paid for and received by each peer device 14 coupled with the local network 12. As such, users of the system 50 may minimize their total expense associated with the requesting content from the Internet by leveraging content received by each network participant.

Figure 3:
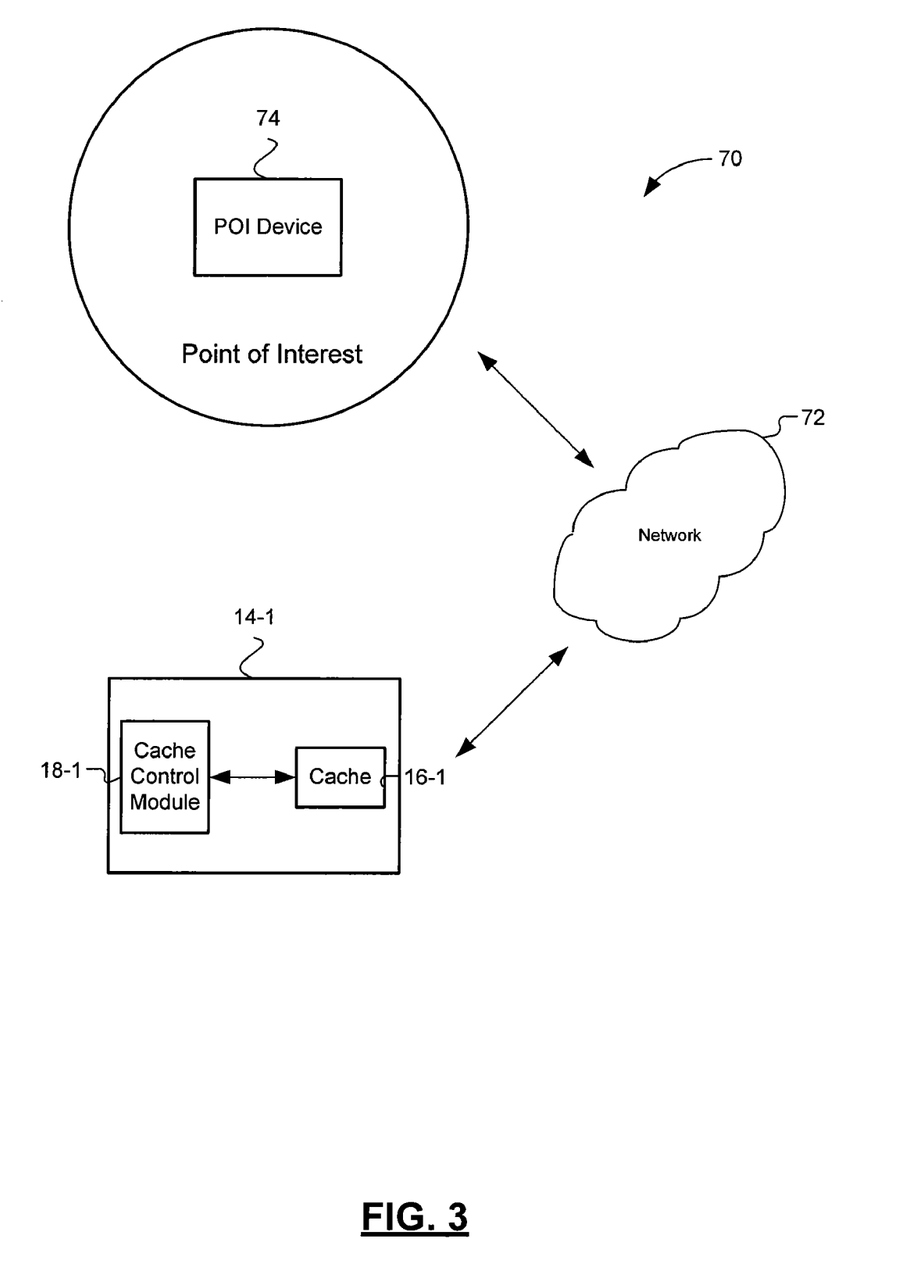
FIG. 3 is a functional block diagram of yet another exemplary implementation of the caching system.

FIG. 3 depicts a second exemplary implementation of the disclosed caching system. In FIG. 3, a system 70 includes the peer device 14-1, a network 72, and a device 74 located at a point of interest referred to herein as the point of interest (POI) device 74. In the present disclosure, the point of interest generally includes any location that a user of the peer device 14-1 finds of interest. For example, the point of interest may include, but is not limited to, a commercial venue, an educational institution, and a tourist destination. Although, the peer device 14-1 is depicted as being coupled with the POI device 74 via the network 72, those skilled in the art will appreciate that each of the peer devices 14 may individually establish a connection with the POI device 74 via the network 72 and the peer device 14-1 is representative of each of the peer devices 14.

In the present implementation, the network 72 may include one or more of a wireless network, a wired network, a personal area network (PAN), a local area network (LAN), a wide area network (WAN), a direct connection such as through a Universal Serial Bus (USB) port, and may include the set of interconnected networks that make up an intranet, or other communication network. The network 72 may be the network discussed below with respect to FIG. 5. For the sake of simplicity and brevity, the present embodiment will discuss the operation of the caching system within a wireless network environment.

Figure 5:
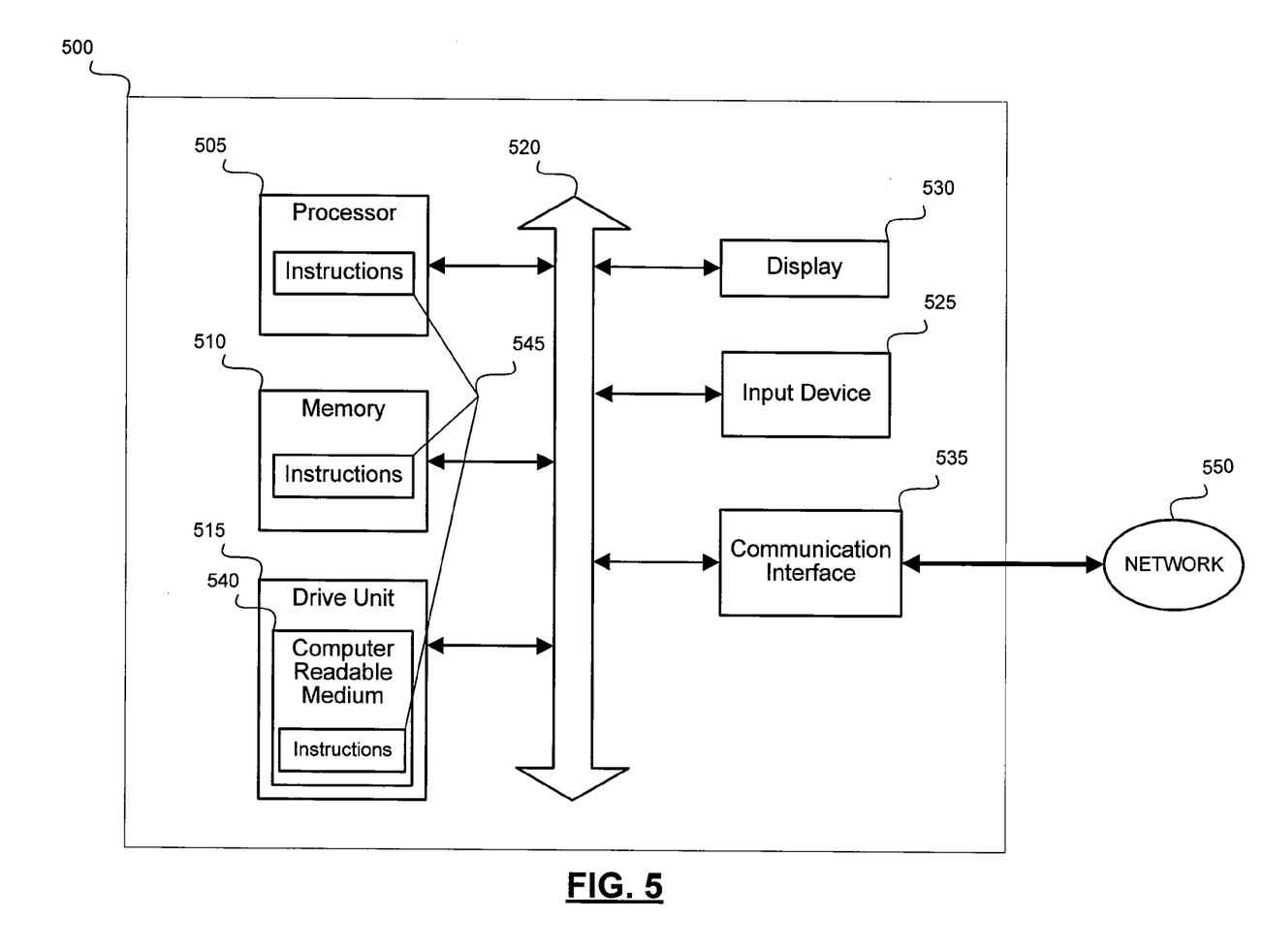
FIG. 5 illustrates a general computer system, which may represent any of the computing devices referenced within the present disclosure.

The POI device 74 is configured to connect with the network 72, may be the general computer system or any of the components as described with respect to FIG. 5. The POI device 74 may include a fixed and/or mobile device. The POI device 72 may communicate with the peer device 14-1 using various wireless technologies such as Bluetooth or Wi-Fi. The POI device 72 is configured to broadcast data (e.g., promotion and/or informational material) associated with the point of interest to any networked device (e.g., peer device 14-1) coupled with the network 72. In other words, each networked device within a broadcast range of the POI device 72 receives the broadcasted data. The broadcast range is based on the type of wireless network technology employed by the network 72.

As mentioned above, the point of interest may include several types of locales. For example, the point of interest may include a museum. The POI device 72 may transmit data such as promotional information related to specific exhibits currently on display within the museum to the peer device 14-1 when the peer device 14-1 is within range of the network 72. The promotional information may prompt a user of the peer device 14-1, asking the user whether the user would like additional information or would like to execute some other transaction. As such, in various embodiments, the peer device 14-1 is configured to receive input commands from the user to either receive additional information from the POI device 74 or perform a transaction. The peer device 14-1 may store the initial promotional information and/or the additional information as published cache data within the cache 16-1.

The user of the peer device 14-1 may then transport the peer device 14-1 to another locality (i.e., a locality outside the range of the network 72) such that the peer device 14-1 establishes a connection with another network (e.g., the network 12 as depicted in FIG. 1). In some embodiments, the peer device 14-1 may be configured with a transmitter (not shown) to broadcast the published cache data (i.e., the initial and/or the additional information) stored within the cache 16-1 to other peer devices 14 coupled with the network 12. In other embodiments, the peer device 14-1 may share the initial and/or additional information among the other peer device 14 as detailed above with reference to FIG. 1.

Figure 4:
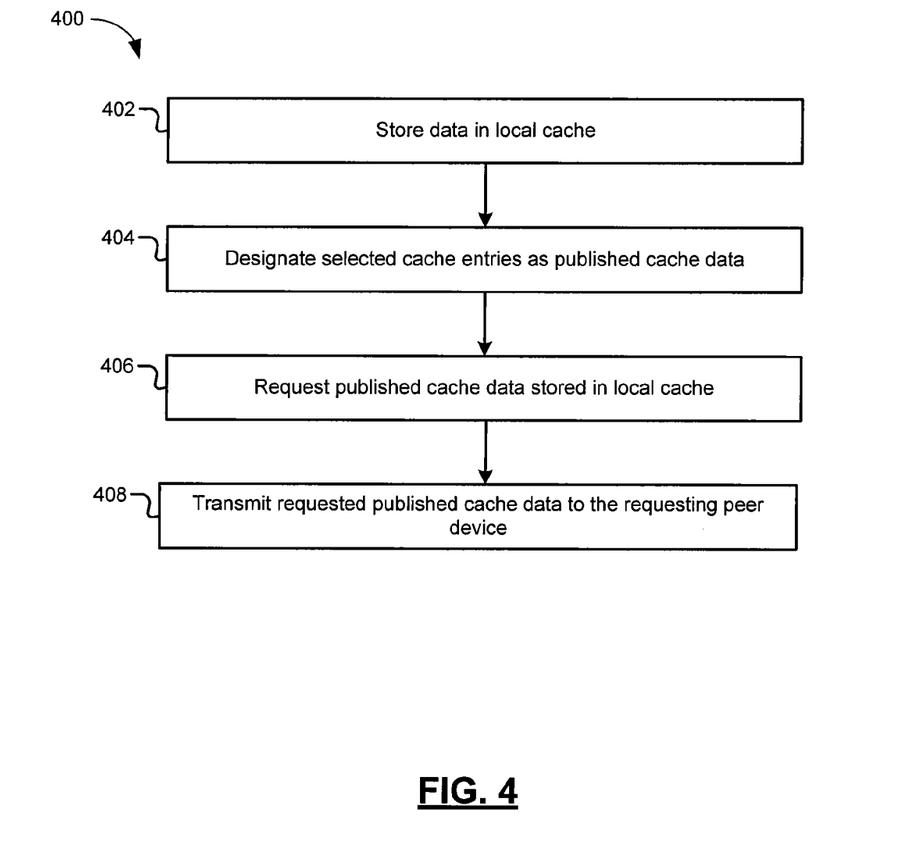
FIG. 4 is a flow diagram illustrating steps of operating an exemplary caching method.

Referring to FIG. 4, an exemplary method 400 of operating the caching system of the present disclosure is shown in more detail. In block 402, a user of the peer device 14-1 stores data into its cache 16-1. In block 404, a user designates selected cache entries of the cache 16-1 as published cache data. In block 406, another peer device 14 coupled to the network 12 may request the published cache data stored within the cache 16-1 of the peer device 14-1. In some embodiments, the cache control module 18 of the peer device 14-1 may determine whether to grant accessibility to its published cache data based on the network relationship between the requesting peer device 14 and the peer device 14-1. In block 408, the peer device 14-1 transmits the requested published cache data to the requesting peer device 14.

Referring to FIG. 5, an illustrative embodiment of a general computer system is shown and is designated 500. Any of the components shown in the computing system 500 may describe the components discussed with respect to FIGS. 1 and 2. The computer system 500 may include a set of instructions 545 that may be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 545 (sequential or otherwise) that specify actions to be taken by that machine. In one embodiment, the computer system 500 may be implemented using electronic devices that provide voice, video or data communication. Further, while a single computer system 500 may be illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 505, such as, a central processing unit (CPU), a graphics processing unit (GPU), or both. The processor 505 may be a component in a variety of systems. For example, the processor 505 may be part of a standard personal computer or a workstation. The processor 505 may be one or more general processors, digital signal processors, application specific integrated circuits, field programmable gate arrays, servers, networks, digital circuits, analog circuits, combinations thereof, or other now known or later developed devices for analyzing and processing data. The processor 505 may implement a software program, such as code generated manually (i.e., programmed).

The computer system 500 may include a memory 510 that can communicate via a bus 520. For example, the registration database 110 may be stored in the memory. The memory 510 may be a main memory, a static memory, or a dynamic memory. The memory 510 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 510 may include a cache or random access memory for the processor 505. Alternatively or in addition, the memory 510 may be separate from the processor 505, such as a cache memory of a processor, the system memory, or other memory. The memory 510 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 510 may be operable to store instructions 545 executable by the processor 505. The functions, acts or tasks illustrated in the figures or described herein may be performed by the programmed processor 505 executing the instructions 545 stored in the memory 510. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 500 may further include a display 530, such as a liquid crystal display (LCD), an organic light emitting diode (OLED), a flat panel display, a solid state display, a cathode ray tube (CRT), a projector, a printer or other now known or later developed display device for outputting determined information. The display 530 may act as an interface for the user to see the functioning of the processor 505, or specifically as an interface with the software stored in the memory 510 or in the drive unit 515. In this regard, the display 530 may be utilized to display, for example, whether a business organization is a candidate for transformation. The display 530 may also be utilized to display a transformation plan. In addition, the various reports and surveys described above may be presented on the display 530.

Additionally, the computer system 500 may include an input device 530 configured to allow a user to interact with any of the components of system 500. The input device 525 may be a number pad, a keyboard, or a cursor control device, such as a mouse, or a joystick, touch screen display, remote control or any other device operative to interact with the system 500.

The computer system 500 may also include a disk or optical drive unit 515. The disk drive unit 515 may include a computer-readable medium 540 in which one or more sets of instructions 545, e.g. software, can be embedded. Further, the instructions 545 may perform one or more of the methods or logic as described herein. The instructions 545 may reside completely, or at least partially, within the memory 510 and/or within the processor 405 during execution by the computer system 500. The memory 510 and the processor 505 also may include computer-readable media as discussed above.

The present disclosure contemplates a computer-readable medium 540 that includes instructions 545 or receives and executes instructions 545 responsive to a propagated signal; so that a device connected to a network 550 may communicate voice, video, audio, images or any other data over the network 550. The instructions 545 may be implemented with hardware, software and/or firmware, or any combination thereof. Further, the instructions 545 may be transmitted or received over the network 550 via a communication interface 435. The communication interface 535 may be a part of the processor 505 or may be a separate component. The communication interface 535 may be created in software or may be a physical connection in hardware. The communication interface 535 may be configured to connect with a network 550, external media, the display 530, or any other components in system 500, or combinations thereof. The connection with the network 550 may be a physical connection, such as a wired Ethernet connection or may be established wirelessly as discussed below. Likewise, the additional connections with other components of the system 500 may be physical connections or may be established wirelessly.

The network 550 may include wired networks, wireless networks, or combinations thereof. Information related to business organizations may be provided via the network 550. The wireless network may be a cellular telephone network, an 802.11, 802.15, 802.20, or WiMax network. Further, the network 550 may be a public network, such as the Internet, a private network, such as an intranet, or combinations thereof, and may utilize a variety of networking protocols now available or later developed including, but not limited to TCP/IP based networking protocols.

The computer-readable medium 540 may be a single medium, or the computer-readable medium 540 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 540 may include a solid-state memory such as a memory card or other package that houses one or more non-volatile read-only memories. The computer-readable medium 540 also may be a random access memory or other volatile re-writable memory. Additionally, the computer-readable medium 540 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The method and system may also be embedded in a computer program product, which included all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

What is claimed is:

1. A system for sharing data within a network, comprising:
a plurality of peer devices including
a first peer device in data communication with the network, each respective peer device of the plurality of peer devices comprising:
local cache storage configured to store data comprising at least one entry designated as network accessible cache data; and
a cache control module operative to control access to the data stored in the local cache storage, wherein each respective cache control module of each respective peer device exchanges with other cache control modules of other peer devices index information cataloging network accessible cache data stored in the respective peer device's local cache storage;
a second peer device of the plurality of peer devices in data communication with the first peer device via the network, wherein the second peer device is configured to request network accessible cache data stored in the local cache storage of the first peer device;
wherein the cache control module of the second peer device is configured to search and retrieve desired network accessible cache data by referencing the respective index information of the respective cache control module of the first peer device.

2. The system of claim 1 wherein the respective cache control module of respective peer devices is further operative to grant access to the portion of the requested network accessible cache data based on a set of permission layers.

3. The system of claim 2 wherein the set of permission layers is based on a relationship between the first peer device and the second peer device.

4. The system of claim 3 wherein the relationship may include a personal relationship between a user of the first peer device and a user of the second peer device.

5. The system of claim 3 wherein the relationship may include a business relationship between a user of the first peer device and a user of the second peer device.

6. The system of claim 1 wherein the respective cache control module is further operative to designate the at least one data entry stored in the local cache storage of the first peer device as network accessible cache data based on input received from a user of the first peer device.

7. The system of claim 1 wherein the respective cache control module of the second peer device is further operative to retrieve a portion of the requested network accessible cache data the first peer device when the respective cache control module determines that the portion of the requested network accessible cache data satisfies the request generated by the second peer device.

8. The system of claim 7 further comprising an additional peer device configured to join the network, the cache control module of the additional peer device configured to transmit its respective index information cataloging network accessible cache data stored in the additional peer device to other peer devices of the plurality of peer devices.

9. The system of claim 1 wherein the second peer device is further configured to broadcast the request for network accessible cache data to each of a plurality of peer devices in data communication with the network, wherein the plurality of peer devices includes the first peer device.

10. The system of claim 1 wherein the network does not include the Internet.

11. The system of claim 1 wherein each respective cache control module is further operative to transmit the requested network accessible cache data without connecting to the Internet.

12. A method for sharing data within a network, comprising:
storing data locally within local cache storage of a first peer device, wherein at least one data entry of the stored data is designated network accessible cache data;
transmitting an index of the stored data to respective other peer devices within the network;
in exchange, receiving a respective index of respective data stored within each respective peer device,
referencing one or more respective indexes to locate desired stored data on one of the respective peer devices;
upon locating the desired stored data at a second respective peer device, transmitting over the network to the directly from a second peer device a request for network accessible cache data stored at the second first peer device; and
receiving over the network from the second peer device the requested network accessible cache data.

13. The method of claim 12 further comprising granting access to a portion of the stored network accessible cache data based on a set of permission layers.

14. The method of claim 13 wherein the set of permission layers is based on a relationship between the first peer device and the second peer device.

15. The method of claim 14 wherein the relationship may include a personal relationship between a user of the first peer device and a user of the second peer device.

16. The method of claim 14 wherein the relationship may include a business relationship between a user of the first peer device and a user of the second peer device.

17. The method of claim 12 further comprising designating the at least one data entry of stored data within the local cache storage of the first peer device as network accessible cache data based on input received from a user of the first peer device.

18. The method of claim 12 further comprising transmitting the request for network accessible cache data to the second peer device based on a determination that the network accessible cache data of the second peer device satisfies the request generated by the first peer device based on the referencing the one or more indexes.

19. The method of claim 18 further comprising receiving from an additional peer device joining the network respective index information cataloging network accessible cache data stored in the additional peer device.

20. The method of claim 12 wherein the first peer device broadcasts the request for network accessible cache data to each of a plurality of peer devices in data communication with the network, wherein the plurality of peer devices includes the first peer device.

21. The method of claim 12 wherein the network does not include the Internet.

22. The method of claim 12 further comprising transmitting the portion of the requested network accessible cache data without connecting to the Internet.

23. A computer-readable non-transitory storage medium storing a computer program that includes instructions for sharing data within a network, the instructions causing a processor to:
 store data locally within local cache storage of a first peer device, wherein at least one data entry of the stored data is designated network accessible cache data;
 transmit an index of the stored data to respective other peer devices within the network;
 in exchange, receive a respective index of respective data stored within each respective peer device,
 reference one or more respective indexes to locate desired stored data on one of the respective peer devices;
 upon locating the desired stored data at a second respective peer device, transmit over the network to the second peer device a request for network accessible cache data stored at the second peer device; and
 receive over the network from the second peer device the requested network accessible cache data.

24. The computer-readable non-transitory storage medium of claim 23 further comprising instructions for causing the processor to grant access to a portion of the stored network accessible cache data based on a set of permission layers.

25. The computer-readable non-transitory storage medium of claim 24 wherein the set of permission layers is based on a relationship between the first peer device and the second peer device.

26. The computer-readable non-transitory storage medium of claim 25 wherein the relationship may include a personal relationship between a user of the first peer device and a user of the second peer device.

27. The computer-readable non-transitory storage medium of claim 25 wherein the relationship may include a business relationship between a user of the first peer device and a user of the second peer device.

28. The computer-readable non-transitory storage medium of claim 23 further comprising instructions for causing the processor to designate the at least one data entry of stored data within the local cache storage of the first peer device as network accessible cache data based on input received from a user of the first peer device.

29. The computer-readable non-transitory storage medium of claim 23 further comprising instructions for causing the processor to transmit the request for network accessible cache data to the second peer device based on a determination that the requested network accessible cache data of the second peer device satisfies the request generated by the first peer device based on reference to the one or more indexes.

30. The computer-readable non-transitory storage medium of claim 29 further comprising instructions for causing the processor to receive from an additional peer device joining the network respective index information cataloging network accessible cache data stored in the additional peer device.

31. The computer-readable non-transitory storage medium of claim 23 wherein the first peer device broadcasts the request for network accessible cache data to each of a plurality of peer devices in data communication with the network, wherein the plurality of peer devices includes the first peer device.

32. The computer-readable non-transitory storage medium of claim 23 wherein the network does not include the Internet.

33. The computer-readable non-transitory storage medium of claim 23 further comprising instructions for causing the processor to transmit the portion of the requested network accessible cache data without connecting to the Internet.

* * * * *